United States Patent [19]

Whetsel

[11] Patent Number: 5,362,384

[45] Date of Patent: Nov. 8, 1994

[54] MULTI-CELL FILTER APPARATUS AND TURBIDITY MONITOR

[75] Inventor: Jackie G. Whetsel, Oregon, Ill.

[73] Assignee: Aqua-Aerobic Systems, Inc., Rockford, Ill.

[21] Appl. No.: 92,442

[22] Filed: Jul. 14, 1993

[51] Int. Cl.⁵ .................................................. B01D 24/44
[52] U.S. Cl. ................................... 210/85; 210/96.1; 210/275; 210/745; 210/793
[58] Field of Search ............... 210/93, 108, 275–279, 210/284, 292, 293, 411, 413, 94, 745, 793, 85, 96.1

[56] References Cited

U.S. PATENT DOCUMENTS

| | | | |
|---|---|---|---|
| 4,152,265 | 5/1979 | Meyers | 210/276 |
| 4,540,487 | 9/1985 | Johnson et al. | 210/276 |
| 5,089,117 | 2/1992 | Nichols | 210/93 |
| 5,234,600 | 8/1993 | Kupke | 210/275 |
| 5,288,398 | 2/1994 | Angelino | 210/275 |

*Primary Examiner*—Joseph W. Drodge
*Attorney, Agent, or Firm*—Vernon J. Pillote

[57] ABSTRACT

A filter apparatus having a backwash head arranged to up-flow backwash one filter cell at a time, and a scavenging means having a fluid intake head arranged to communicate with at least two cell ports at the same time to downflow scavenge each filter cell the first time when the backwash head is in a position to backwash one filter cell and a second time when the backwash head is in a position to backwash a succeeding filter cell. Turbidity monitoring means having a monitor inlet conduit mounted on the fluid intake head, is arranged for communication with the cell port adjacent the end of the fluid intake head that trails during the backwash run, to monitor turbidity of fluid from each cell port only after the associated filter cell has scavenged at least once. The apparatus is arranged so that the backwash pump has its outlet connected to the backwash port of the backwash head and its inlet connected to the fluid intake port of the scavenging means to receive at least a portion of the backwash fluid through the intake port and utilize fluid scavenged from the cell ports to backwash a succeeding port.

19 Claims, 3 Drawing Sheets

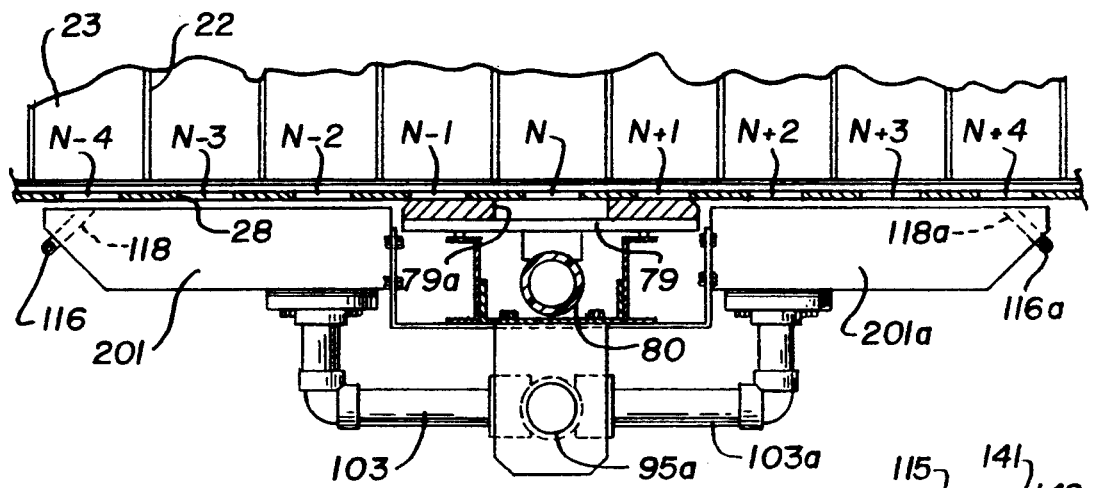
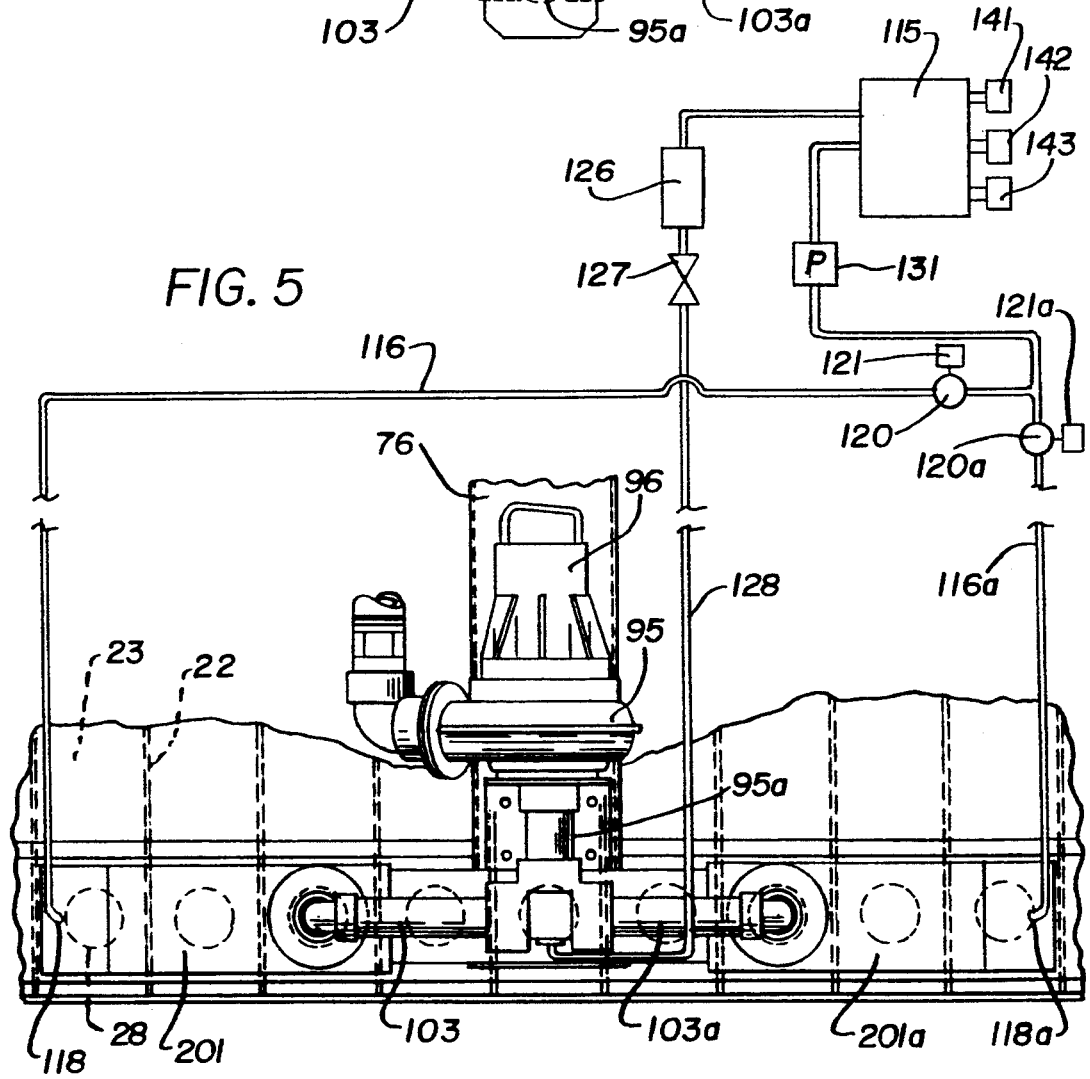

MULTI-CELL FILTER APPARATUS AND TURBIDITY MONITOR

BACKGROUND OF THE INVENTION

The present invention relates to a multi-cell filter apparatus of the type in which the filter cells are backwashed by a traveling backwash mechanism that progresses along the tank, for example as disclosed in U.S. Pat. Nos. 4,152,265 and 4,540,487, owned by the assignee of the present invention. In general, such filter apparatus include a filter bed supported above the bottom of the tank on a generally horizontal filter bed support with partitions provided at spaced locations along the tank and separating the bed into a plurality of filter cells each including an upper compartment above the filter bed support and a lower compartment below the filter bed support. A backwash carriage is mounted for movement along the tank in a carriage path and cell ports are uniformly spaced apart along a port locus paralleling the carriage path with each cell port communicating with the lower compartment of an associated one of the filter cells. A filtrate launder extends along the port locus and communicates with the cell ports to receive filtered water from the cells. The carriage is driven by carriage drive means along the carriage path in a backwash run.

A backwash head is carried by the carriage for movement along the port locus and backwash fluid is supplied to the backwash head during a backwash run to sequentially up-flow backwash the filter cells. The fluid used in backwashing the filter cells is normally filtered water and after completion of the backwashing of a filter cell, the filtrate compartment associated with that filter cell is usually filled with filtered water. When the filter cell that has been backwashed is returned to filter service, there is an initial period of relatively good effluent water from the filtrate compartment due to the clean backwash water remaining in the filtrate compartment. However, there then occurs a period in which the effluent quality from the backwashed filter cell is substantially poorer than the average effluent quality of the filter apparatus. The poorer quality effluent usually continues while the flow of material that remains in the bed and above the bed during backwashing, passes out of the backwashed filter cell and until a filter mat begins to form on the surface of the bed. The filter mat which forms on the surface of the bed during a filter run is much more effective in removing the suspended material in the effluent than the filter media alone, and the highest effluent quality is obtained from each cell after a filter mat has formed on the surface. Although the degraded effluent from the filter cell that has just been backwashed is mixed and diluted in the filtrate launder with the higher quality effluent from a number of other filter cells, this degraded effluent does affect the average effluent quality from the filter.

In the filter apparatus disclosed in U.S. Pat. No. 4,540,487, a traveling cell scavenging means was provided to downflow scavenge and rinse each cell after it has been backwashed, and before it was returned to service. The cell scavenging means included a fluid intake head mounted on the carriage at a location to trail the backwash head during movement along the backwash run and to operate when the carriage moved along the backwash run to sequentially withdraw fluid from each cell port and downflow scavenge the associated filter cell subsequent to the backwashing of each filter cell. U.S. Pat. No. 4,540,487 also discloses that the backwash pump can advantageously be arranged with its intake connected to the cell scavenging head so that fluid scavenged from the cells after backwashing was used in the backwashing of a succeeding cell.

The normal filtration rate in filters of the type described above is relatively low, generally of the order of two gallons per square foot per minute. However, a relatively high rate of flow, for example in the order of fifteen gallons per minute per square foot, is required for proper backwashing of the filter cells. In order to prevent break through of turbidity during scavenging, the downflow scavenging rate should only be slightly above the normal filtration rate, for example to about three gallons per square foot per minute.

Although the backwash rate is relatively high, the time required for backwashing is relatively low, for example of the order of one-half minute or less. However, since the scavenge rate must be relatively low to prevent break through, the time required for proper scavenging each cell would often be substantially greater than the time required for backwashing of a cell.

U.S. Pat. No. 5,089,117 discloses a filter apparatus in which clean water from a filtrate launder is first pumped through a backwash head in a direction to up-flow backwash a filter cell and then, while the backwash head remains in communication with that filter cell, fluid is pumped in the opposite direction from the backwash head in a downflow purging operation. In the embodiment of FIGS. 1 and 2 of that patent, the backwash head has a second port that trails the backwash port during a backwash run and fluid is pumped from the second port to a turbidity meter, to monitor the turbidity of that cell after backwashing. This arrangement requires that the backwash head dwell at each port for a time sufficient to first backwash the cell and thereafter purge the cell and significantly increases the time required for backwashing the filter apparatus. The embodiment disclosed in FIG. 3 of that patent differs from those shown in FIGS. 1 and 2 in not having any provision for purging filter beds following backwashing. The turbidity of the previously backwashed filter bed is monitored until the monitor signals that a predetermined level of turbidity exists in the liquid issuing from the previously backwashed filter bed. Since there is no purging of the filter cell prior to monitoring in the system disclosed in FIG. 3, the monitor may substantially delay advance of the backwash shoe to the next filter bed and correspondingly increase the amount of filtered water consumed during backwashing of the filter cell.

SUMMARY OF THE INVENTION

It is the general object of the present invention to provide a filter apparatus for sequentially backwashing a plurality of filter cells, scavenging each filter cell subsequent to backwashing, and monitoring the turbidity of effluent from the filter cells before returning the filter cell to service, and which minimizes the amount of filtrate consumed during backwashing, scavenging and monitoring of the filter cells.

Accordingly, the present invention provides a filter apparatus having a backwash head arranged to up-flow backwash one filter port at a time, and a scavenging means having a fluid intake head arranged to communicate with at least two cell ports at the same time to downflow scavenge each filter cell the first time when the backwash head is in a position to backwash one filter cell and a second time when the backwash head is in a position to backwash a succeeding filter cell. Turbidity monitoring means having a monitor inlet conduit mounted on the fluid intake head, is arranged for communication with the cell port adjacent the end of the fluid intake head that trails during the backwash run, to monitor turbidity of fluid from each cell port only after the associated filter cell has scavenged at least once. The apparatus is advantageously arranged so that the backwash pump has its outlet connected to the backwash port of the backwash head and its inlet connected to the fluid intake head of the scavenging means to receive at least a portion of the backwash fluid through the intake head and utilize fluid scavenged from the cell ports to backwash a succeeding port.

BRIEF DESCRIPTION OF THE DRAWINGS

FIG. 5 is a fragmentary vertical sectional view illustrating a second embodiment of the present invention; and FIG. 6 is a fragmentary horizontal sectional view of the embodiment of FIG. 5.

DETAILED DESCRIPTION

Figure 1:
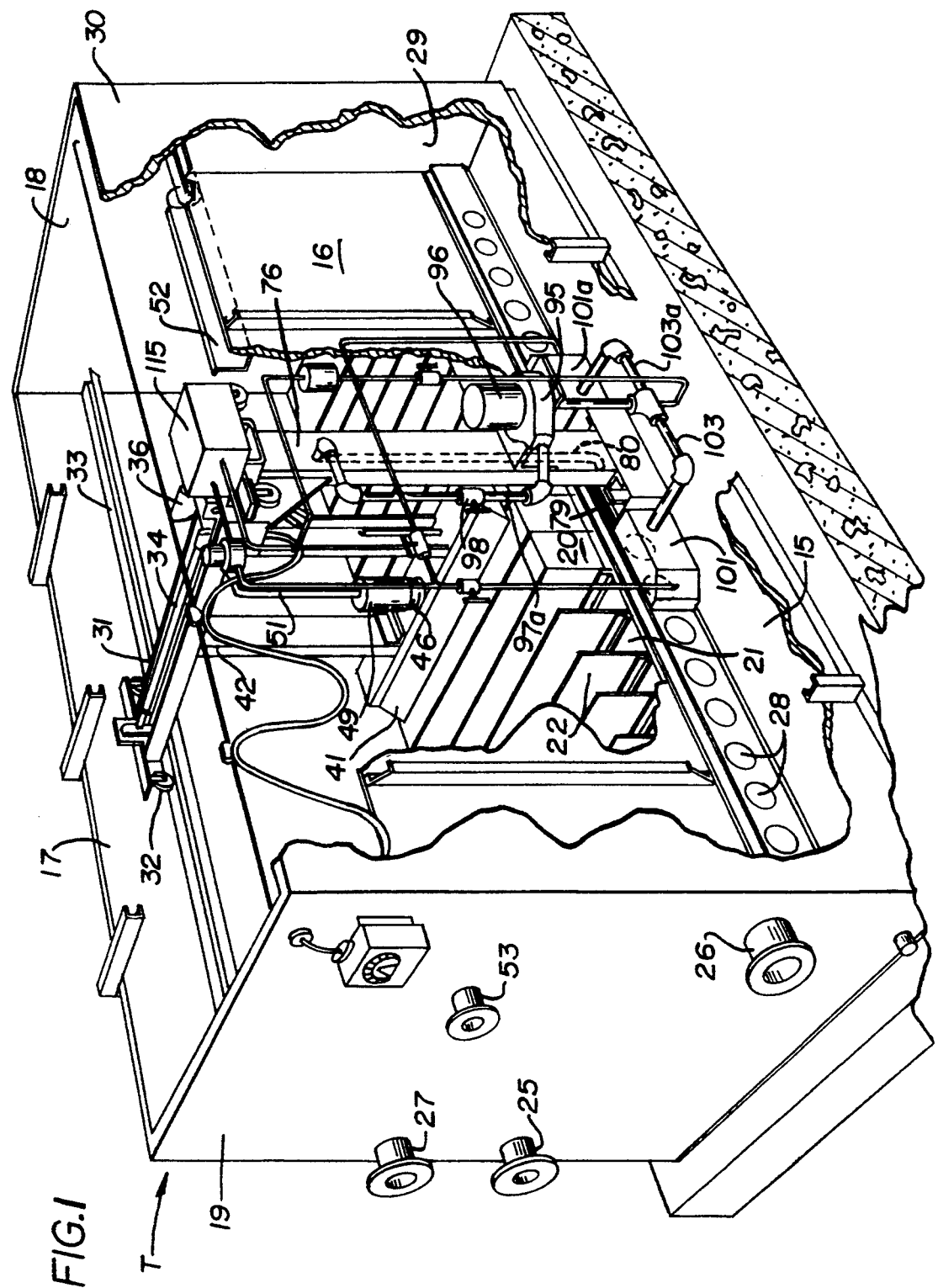
FIG. 1 is a perspective view of a filter apparatus embodying the present invention, with parts broken away to illustrate details of construction.
Figure 3:
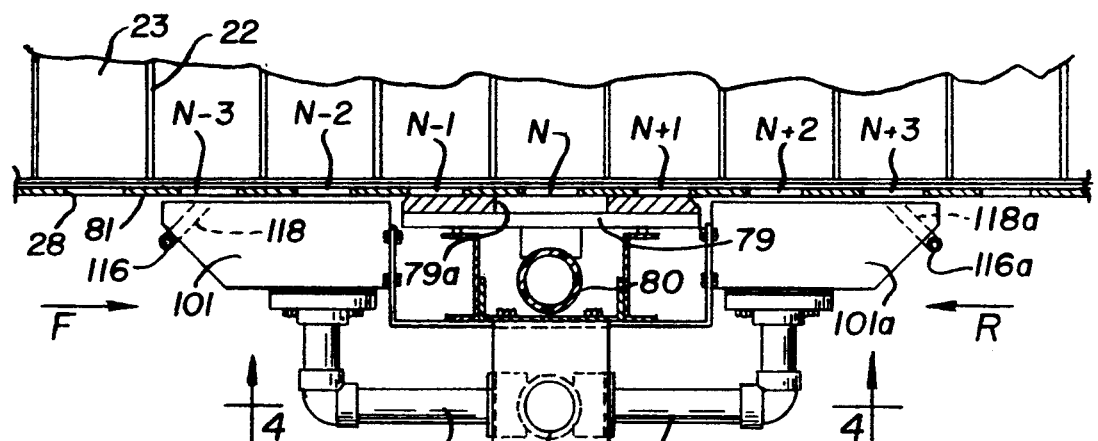
FIG. 3 is a fragmentary horizontal sectional view.
Figure 4:
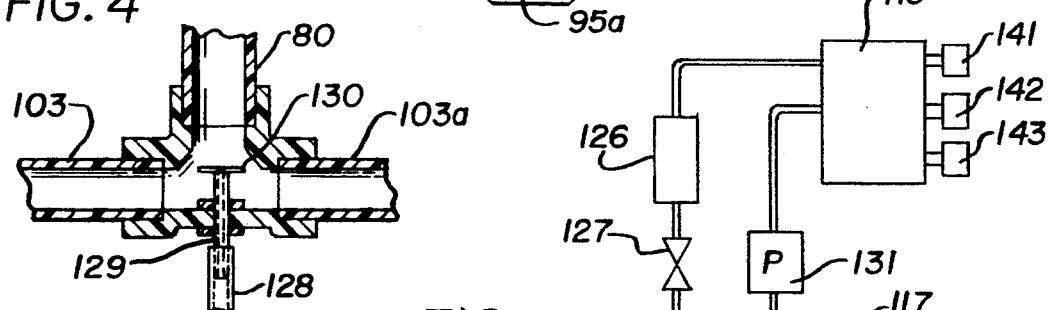
FIG. 4 is a fragmentary vertical sectional view taken on the plane 4—4 of FIG. 3.
Figure 2:
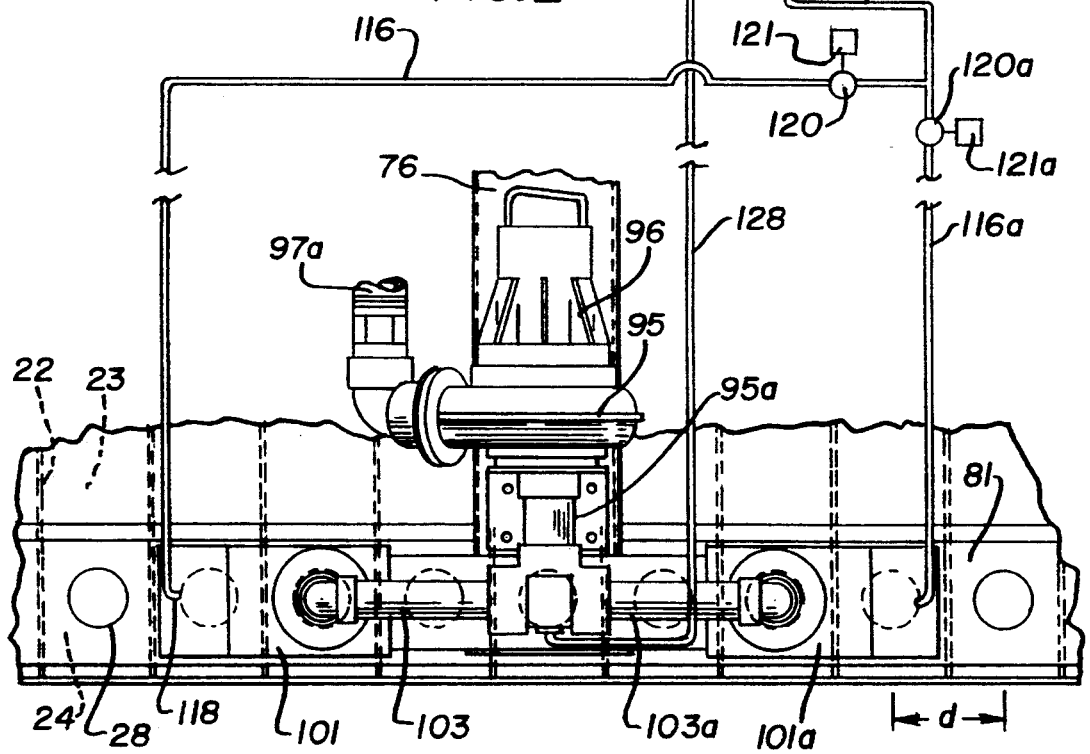
FIG. 2 is a fragmentary vertical sectional view of the filter apparatus shown in FIG. 1.

Referring first to FIGS. 1-3, the filter apparatus in general includes a tank T herein shown of rectangular configuration including a bottom 15, space side walls 16 and 17 and end walls 18 and 19. A filter bed of particulate material 20 is supported on a generally horizontal filter bed support 21 above the bottom of the tank and generally upright partitions 22 are spaced apart along the tank and separate the bed into a plurality of filter cells each including an upper compartment 23 and a lower compartment 24 below the filter bed support as shown in FIG. 2. The filter bed support is conveniently in the form of porous slabs or apertured plates disposed between and supported on the partitions. The water or fluid to be filtered is supplied to the tank at a level above the bed of filter material through an influent line 25 or through an influent channel as shown in U.S. Pat. No. 4,152,265. The fluid passes downwardly through the filter bed and through the filter bed support and into the filtrate compartments below the filter bed support. A plurality of cell ports 28, one for each filter compartment, are provided in side walls 16 and 17 and communicate with one end of a respective filter cell. An outer wall 30 (FIG. 1) is spaced from the wall 16 and defines a filtrate launder 29 that extends along the length of the tank to receive filtered water from the cell ports. An overflow outlet 27 is provided in the tank at a level above the influent line 25 and is arranged to pass water from the tank when the liquid reaches a preselected upper level. A filtered water outlet 26 communicates with the filtrate launder 29 and is spaced above the bottom of the launder to maintain the liquid level in the launder at a level above the top bed and below the liquid level in the tank T. The tank can be formed of any suitable material, for example metal as shown in the drawing or concrete as shown in U.S. Pat. No. 4,152,265. While the tank shown herein is of rectangular configuration, it is apparent that the tank could be of circular configuration with the partitions arranged to form generally wedge shaped filter cell compartments.

The filtrate cells are progressively backwashed by a traveling backwash apparatus carried by a bridge or carriage 31. The carriage is supported by flanged wheels 32 for movement along a track 33 in a generally horizontal carriage path along the tank. The carriage 31 is reversibly driven along the track as by a motor 36 and drives the shaft 34 through a speed reducing drive. The shaft 34 can be connected to the drive wheels 32 as described in the aforementioned U.S. Pat. No. 4,152,265 or alternatively can drive sprockets at opposite ends of the shaft that mesh with chains (not shown) extending lengthwise of the tank.

The backwash apparatus includes a collector hood 41 that is suspended from the carriage 31 as by support members 42 for movement along a path closely adjacent the upper surface of the filter bed 20. As shown in FIG. 1, the collector hood has a length measured crosswise of the path of travel of the carriage which is only slightly less than the space in between the side walls 16 and 17 of the tank to span the width of the tank, and the hood is positioned to extend closely adjacent the surface of the bed. A waste water pump 46 driven by a motor 49, has its inlet connected to the collector hood and an outlet connected to a discharge pipe 51. The outlet end of the discharge pipe is arranged to discharge into a waste water trough 52 that extends the length of the tank. Water from the waste water trough 52 flows through a waste water outlet 53, conveniently formed in end wall 19 of the tank.

A backwash head 79 is attached to the carriage for movement therewith and, as best shown in FIG. 3, an arm 76 is attached at its upper end to one end of the carriage and extends downwardly into the filtrate launder 29 to a level adjacent the cell ports 28. As best shown in FIGS. 2 and 3, the backwash head is arranged to slidably engage a guide plate 81 having the cell ports 28 at uniformly spaced locations therealong, with each cell port with a respective one of the filter cells. The guide plate may, for example, be formed of a wear resistant synthetic resin material. The backwash head 79 has an elongated backwash port 79a adapted for movement into and out of registry with the filtrate ports 28, and a backwash water supply pipe 80 communicates with the port 79a to supply backwash water to the filtrate ports. The backwash head 79 is resiliently biased against the guide plate to form a sliding seal therewith. The cell ports 28 are uniformly spaced apart a distance d along the port locus and each cell port communicates with a respective one of the filter cells. In the preferred embodiment shown, the backwash port 79a in the backwash head has a length substantially corresponding to the center-to-center spacing of the cell ports 28 and the cell ports have a diameter substantially corresponding to one-half the cell width and have centers spaced apart a distance equal to the cell width. With this arrangement, the elongated backwash port 79a in the backwash head will start to cut off flow to the cell port of one cell at about the same time it starts to introduce backwash fluid into the cell port associated with the next succeeding cell and, when the backwash port 79a moves into full communication with the cell port in the next succeeding cell, it cuts off communication with the cell port of the preceding cell. The backwash port 79a in the backwash head remains in full communication with the cell port associated with each cell while the carriage travels a distance approximately equal to one-half the cell width, before it begins to communicate with the cell port associated with the succeeding cell. Thus, full backwash flow is supplied to each cell while the carriage moves a distance corresponding to one-half the cell width and the flow to that cell is thereafter gradually cut off while the flow to the succeeding cell is initiated and gradually increased.

Backwash water is supplied to the backwash head 79 by a pump 95 driven by a motor 96. The backwash pump is preferably of the centrifugal type and the motor 96 is preferably of a submersible type so that the motor and pump can be mounted as a unit adjacent the lower end of the arm 76 for movement with the carriage. The backwash pump 95 has an inlet 95a at its lower end and the outlet of the backwash pump is connected through a delivery conduit 97a to the backwash water supply pipe 80 in the backwash head to supply backwash water thereto during backwashing. A flow rate adjusting valve 98 (FIG. 1) is provided in the backwash delivery conduit 97a to facilitate adjustment of the backwash flow rate.

Cell scavenging means is provided on the carriage to effect downflow scavenging of each filter cell after up-flow backwashing. The cell scavenging means includes a fluid intake head 101 mounted on the carriage for movement therewith sequentially into juxtaposition with each of the cell ports 28 after the filter cell has been backwashed. The fluid intake head 101 is mounted at a location to trail the backwash head during movement of the carriage in a forward direction designated by the arrow F in FIG. 3 and, in order to enable backwashing and scavenging during movement of the carriage in both directions, a second fluid intake head 101a is mounted on the carriage at a location to trail the backwash head during the turn movement indicated by the arrow R. In the preferred embodiment illustrated, the inlet of the backwash pump 95 is connected through pipes 103 and 103a to the fluid intake heads 101 and 101a.

Each fluid intake head is arranged to communicate with at least two cell ports at the same time that the backwash head communicates with a single cell port. In the preferred embodiment shown, the backwash head 79 is arranged so that, when the backwash port 79a is centered with respect to one cell port designated N as shown in FIG. 3, the shoe overlaps and blocks flow through the cell ports designated N−1 and N+1 respectively at the trail and lead sides of the port N, to allow time for the bed to settle on each side of the cell being backwashed. The intake heads 101 and 101a are positioned closely adjacent the backwash shoe and, when the backwash shoe is positioned with the port 79a centered with respect to one port N, the intake head 101 is positioned to communicate with two cell ports designated N−2 and N−3 and respectively spaced a distance two times d and three times d from the cell port N at the backwash head during movement in the forward direction at the left. Similarly, the intake head 101a is positioned to communicate with two cell ports designated N+2 and N+3 and respectively spaced two times d and three times d from the port being backwashed, during movement in the reverse direction indicated by the arrow R. As previously described, the rate of flow of fluid required to properly backwash a cell is substantially higher than the rate of downflow through the filter cell in a normal filter operation and substantially more than twice the normal filter rate. It is accordingly not necessary to maintain a running seal between the fluid intake head 101 and the filtrate ports and the head can have its edge spaced a slight distance from the guide plate as shown to allow flow into the intake head from the filtrate launder. In the embodiment shown, both intake heads 101 and 101a are in open communication with the inlet of the backwash pump, it being apparent that valves could be provided in conduits 103, 103a and arranged so that only intake head 101 communicated with the backwash pump when moving in the forward direction F and only intake head 101a communicated with the intake of the backwash pump during movement in the direction R. While the backwashing and scavenging apparatus is herein arranged to enable backwashing and scavenging when the carriage moves in either direction, it is apparent that the apparatus could be arranged for backwashing in only one direction and one fluid intake head 101a omitted. In this event, backwashing and scavenging is stopped during return movement of the carriage. As is conventional, the carriage can be driven in continuous fashion during the backwash run or, alternatively, the carriage can be driven in step fashion with a dwell at each filter cell. Such continuous and intermittent or step-type drives for backwash carriages are well known in the art and detailed description is accordingly deemed unnecessary.

Monitoring means are provided for monitoring the turbidity of the effluent from each cell subsequent to backwashing of the cell and only after the cell has undergone at least one scavenge cycle corresponding to the duration of the backwash cycle of a succeeding cell, and further while the cell is being scavenged at least a second time. Thus, as illustrated in FIG. 3, when the backwash port 79a is centered with respect to one filter cell port N and while the backwash shoe blocks both the adjacent cell ports N−1 and N+1, the fluid intake head 101 communicates with ports designated N−2 and N−3. The filter cell associated with port N−2 is scavenged a first time during backwashing of cell N. The filter cell associated with port N−3 was scavenged a first time during backwashing of cell N−1 and is scavenged a second time during backwashing of cell N. Similarly, when the backwash head advances to a position to backwash cell associated with port N+1, cell N−1 will undergo a first scavenge operation and cell N−2 will undergo a second scavenge operation.

The turbidity monitor means includes a turbidity meter 115 and monitor inlet conduits 116, 117. Conduit 116 has an inlet end 118 mounted on the fluid intake head 101 and arranged for communication with a cell port adjacent an end of the intake head that trails during the backwash run to monitor turbidity of fluid from a cell port only after the associated filter cell has been scavenged at least once. As previously described, the second fluid intake head 101a is advantageously provided for scavenging during movement of a backwash head in the return direction R. The monitor intake conduit means accordingly provides as second inlet conduit 116a connected to the conduit 117 and having an inlet end 118a mounted on the fluid intake head 101a and arranged for communication with a cell port adjacent an end of the intake head 101a that trails during movement of the backwash head in the direction R. Valves 120 and 120a (FIG. 2) are provided in the intake conduits 116, 116a respectively and are selectively operable by electroresponsive or pneumatic actuators 121, 121a respectively to communicate the inlet conduit 117 with conduit 116 during movement of the backwash head in a forward direction F, and with the conduit 116a during movement of the backwash head in the return direction R.

Turbidity meters such as indicated at 115 are commonly designed for measuring turbidity in fluid at a selected rate of flow and, as diagrammatically indicated in FIG. 2, fluid is discharged from the turbidity meter through a flow meter 126 and an adjustable valve for adjusting the rate of flow of fluid through the turbidity meter. The desired rate of flow through a turbidity meter is usually relatively low and liquid from the turbidity meter can be discharged to waste or back into the tank T. However, the outlet of the turbidity meter is preferably connected through a tube 128 to a fitting 129 communicating with the inlet of the backwash pump 95 if fitting 129 has a baffle 130 to produce a low pressure zone at the outlet of the tube 128 such that the backwash pump can draw fluid from conduit 116 or 116a through the turbidity meter 115 and flow controller 126. In the embodiment illustrated a small positive displacement pump 131 is also provided in the monitor intake conduit 117, to pump fluid from intake conduits 116 or 116a through conduit 117 to the turbidity monitor 115.

Arranging the turbidity monitoring means so that it monitors effluent from a cell only after that cell has been scavenged at least once during backwashing of one cell and while it is being scavenged a second time during backwashing of still another cell, markedly increases the likelihood that the cell effluent will have reached the desired low level before the backwashing operation on the second preceding cell has been completed. The turbidity monitor 115 can be arranged to operate a visual or audio signal or both indicated at 141, or a recorder indicated at 142 to inform the filter operator in the event the effluent from a certain filtering cell did not reach the desired low level after two successive scavenging operations. The turbidity meter can also be arranged to operate a control indicated at 143d connected to the carriage drive or indexing control, to delay advance of the backwash head until the turbidity in the cell being monitored is below a preselected level.

The embodiment of FIGS. 5 and 6 is substantially the same as that previously described and like numerals are used to designate the same parts. The fluid intake heads are modified and like numerals in the 200 series are used to designate the modified fluid intake heads. Fluid intake heads 201 and 201a are each arranged to communicate with at least three cell ports so that the filter cell associated with each cell port is scavenged at least three times during the backwashing of three successive cells. Thus, when the backwash port 79a is centered with respect to one cell port designated N in FIG. 6, and the backwash shoe 65 blocks flow through ports N−1 and N+1 on either side of the cell port N, intake head 201 communicates with cell ports N−2, N−3 and N−4. Thus, the filter cell associated with port N−2 undergoes a first scavenge operation during backwashing of the filter cell associated with port N; a second scavenge operation during backwashing of the cell associated with port N+1 and a third scavenge operation during backwashing of the cell associated with the port N+2. In this embodiment, the inlet end 118 of the monitor intake conduit is arranged for communication with the cell port adjacent the end of the intake head that trails during the backwash run to monitor turbidity of fluid from the cell port only after the filter cell has been scavenged at least twice and while it is being scavenged a third time. Similarly, the intake end 118a of the fluid intake conduit 116a is mounted on the intake head 201a and arranged for communication with the cell port adjacent the end of the intake head that trails during movement of the backwash head in the reverse direction R, to monitor turbidity of fluid from the cell port only after the cell has been scavenged at least twice and while it is being scavenged a third time.

In summary, the disclosed filter apparatus effects scavenging or purging of each cell at least one backwash operation prior to monitoring and while the cell is undergoing at least a second scavenging operation during a succeeding backwash operation without correspondingly increasing the backwash time for each cell. Since the backwash flow rate is very high as compared to the proper flow rate for downflow scavenging of a cell, even small increases in backwash time for one cell to provide adequate scavenging or purging a preceding cell significantly increases the amount of water consumed during each backwash operation and reduces the overall capacity of the filter apparatus. Further, since the cell is monitored for turbidity only after it has been scavenged for a time corresponding to the duration of at least one backwash operation, the turbidity of the effluent from the cell being monitored is lowered so that contamination of the turbidity meter is reduced.

The embodiments of the invention in which an exclusive property or privilege is claimed are defined as follows:

1. In a filter apparatus of the type including a tank, a filter bed support in the tank for supporting a bed of filter material above the bottom of the tank, carriage means mounted for movement along the tank in a carriage path, a plurality of partitions extending transverse to the carriage path and spaced apart there along separating the bed into a plurality of filter cells each including an upper compartment above the filter bed support and a lower compartment below the filter bed support, influent means for supplying an influent to the tank above the bed, a port plate including a plurality of cell ports having centers uniformly spaced apart a distance d along a port locus paralleling said carriage path with each cell port communicating with the lower compartment of an associated one of the filter cells, a filtered water effluent launder extending along said port locus and communicating with said cell ports, carriage drive means for driving the carriage means along the carriage path in a backwash run, backwash means including a backwash head carried by the carriage means for movement along the port locus, scavenging means including a fluid intake head carried by the carriage means at a position trailing the backwash head during movement along the port locus and having intake opening means disposed adjacent said port plate and out of sliding engagement therewith, means for operating the backwash means during the backwash run to supply backwash fluid to the backwash head, means for operating the scavenging means to draw fluid into the fluid intake head, the backwash head having a face slidably engaging said port plate and backwash port means in said face constructed and arranged for communication with only one cell port at a time, to up-flow backwash only one filter cell at a time, the backwash head having means operative when the backwash port means is centered with respect to one cell port n, for blocking flow through a cell port spaced the distance d from the cell port n, the fluid intake head having intake opening means constructed and arranged for communication with at least two cell ports at the same time having centers respectively spaced a distance two times d and three times d from the center of said one cell port to downflow scavenge each filter cell a first time when the backwash head is in a portion to backwash one filter cell and at least a second time when the backwash head is in a position to backwash a succeeding filter cell, the improvement comprising monitoring means including a turbidity meter and a monitor intake conduit having an let end mounted for movement with the fluid intake head and arranged for communication with a cell port adjacent an end of the intake head that trails during the backwash run and is spaced at least three times d from the center of said one cell port to monitor turbidity of fluid from a cell port, communicating with a given filter cell which has been scavenged at least once during the backwash run, the backwash means including a backwash pump having an outlet connected to the backwash port means and an inlet connected to the fluid intake opening means to receive at least a portion of the backwash fluid through said intake opening means.

2. A filter apparatus according to claim 1 wherein the intake opening means is constructed and arranged for communication with only two cell ports at a time, the monitoring means being arranged to monitor turbidity of fluid from a cell port after the given filter cell has been scavenged once and while that filter cell is being scavenged a second time.

3. A filter apparatus according to claim 1 wherein the intake opening means is constructed and arranged for communication with three adjacent cell ports at he same time to downflow scavenge each filter cell during backwashing of three successive filter cells, the monitoring means being arranged to monitor turbidity of fluid from a cell port after the given filter cell has been scavenged twice and while the filter cell is being scavenged a third time during the backwash run.

4. A filter apparatus according to claim 1 wherein said monitoring means includes a pump for pumping liquid from the monitor intake conduit to the turbidity meter.

5. A filter apparatus according to claim 1 wherein, when the backwash port means is centered with respect to one cell port, the intake opening means is arranged to communicate with two cell ports having centers respectively spaced a distance two times d and three times d from the center of said one cell port n, the inlet end of the monitor intake conduit being arranged to communicate with a cell port spaced three times d from said one cell port n.

6. A filter apparatus according to claim 1 wherein, when the backwash port means is centered with respect to one cell port, the intake opening means is arranged to communicate with three cell ports having center respectively spaced two times d; three times d; and four times d from the center of said one cell port, said monitoring means intake conduit arranged to communicate with said cell port having a center spaced four times d from said cell port.

7. A filter apparatus according to claim 1 wherein the carriage drive means drives the carriage means in continuous fashion during the backwash run.

8. A filter apparatus according to claim 1 wherein the carriage drive means drives the carriage means in intermittent fashion during the backwash run with the carriage means dwelling at each filter cell.

9. A filter apparatus according to claim 1 wherein said monitoring means includes means for producing a signal when the turbidity of the liquid being monitored is above a preselected minimum.

10. A filter apparatus according to claim 1 wherein the monitoring means includes control means for delaying movement of the carriage means to backwash a succeeding filter cell until the turbidity of the liquid being monitored is below a preselected level.

11. In a filter apparatus of the type including a tank, a filter bed support in the tank for supporting a bed of filter material above the bottom of the tank, carriage means mounted for movement along the tank in a carriage path, a plurality of partitions extending transverse to the carriage path and spaced apart there along separating the bed into a plurality of filter cells each including an upper compartment above the filter bed support and a lower compartment below the filter bed support, influent means for supplying an influent to the tank above the bed, a plurality of cell ports uniformly spaced apart a distance d along a port locus paralleling said carriage path with each cell port communicating with the lower compartment of an associated one of the filter cells, a filtered water effluent launder extending along said port locus and communicating with said cell ports, carriage drive means for driving the carriage means along the carriage path in a backwash run, backwash means including a backwash head carried by the carriage means for movement along the port locus, scavenging means including a fluid intake head carried by the carriage means at a position trailing the backwash head during movement along the port locus, means for operating the backwash means during the backwash run to supply backwash fluid to the backwash head, means for operating the scavenging means to draw fluid into the fluid intake head, the backwash head having backwash port means constructed and arranged for communication with only one cell port at a time to up-flow backwash only one filter cell at a time, the fluid intake head having intake opening means constructed and arranged for communication with at least two adjacent cell ports at the same time to downflow scavenge at least two filter cells, the backwash head and fluid intake head being constructed and arranged such that, when the backwash port is centered with respect to a cell port n, (a) means on the backwash head at the trailing side of the backwash port means for blocking flow through a cell port spaced said distance d from the cell port n and, (b) the intake opening means communicates with at least two cell ports that are respectively spaced a distance two times d and three times d from the cell port n, the improvement comprising; monitor means including a turbidity meter and monitor intake conduit means having an inlet end mounted on a fluid intake head means at a location arranged to communicate with a cell port spaced a distance at least three times d from the cell port n.

12. A filter apparatus according to claim 11 wherein the backwash means includes a backwash pump having an outlet connected to the backwash port means and an inlet connected to the intake opening means to receive at least a portion of the backwash fluid through said intake opening means.

13. A filter apparatus according to claim 11 wherein the intake opening means is arranged for communication with only two cell ports at a time, the inlet end of the monitor intake conduit means being located to communicate with a cell port spaced three times d from the cell port n.

14. A filter apparatus according to claim 11 wherein the intake opening means is arranged to communicate with three cell ports at a time and inlet end of the monitor intake conduit is located to communicate with a cell port spaced four times d from the cell port n.

15. A filter apparatus according to claim 11 wherein the carriage drive means drives the carriage means in continuous fashion during the backwash run.

16. A filter apparatus according to claim 11 wherein the carriage drive means drives the carriage means in intermittent fashion during the backwash run with the carriage means dwelling at each filter cell.

17. A filter apparatus according to claim 11 including a port plate extending along said port locus and having filtrate ports therein, said backwash head having a face slidably engaging said port plate and said backwash port means in said face, said fluid intake head having said intake opening means disposed adjacent said port plate but out of sliding engagement therewith.

18. A filter apparatus according to claim 11 wherein said monitor means includes means for producing a signal when the turbidity of the liquid being monitored is above a preselected minimum.

19. A filter apparatus according to claim 11 wherein the monitor means includes control means for delaying movement of the carriage means to backwash a succeeding filter cell until the turbidity of the liquid being monitored is below a preselected level.

* * * * *

UNITED STATES PATENT AND TRADEMARK OFFICE
CERTIFICATE OF CORRECTION

PATENT NO. : 5,362,384

DATED : November 8, 1994

INVENTOR(S) : Jackie G. Whetsel

It is certified that error appears in the above-identified patent and that said Letters Patent is hereby corrected as shown below:

```
Claim  1, col. 9, line 7, change "portion" to -- position --;
                  line 12, change "let" to -- inlet --.

Claim 3, col. 9, line 33, change "he" to -- the --.
```

Signed and Sealed this

Twenty-seventh Day of December, 1994

Attest:

BRUCE LEHMAN

*Attesting Officer*   *Commissioner of Patents and Trademarks*